S. T. SILVER.
NUT LOCK.
APPLICATION FILED OCT. 11, 1910.
1,042,158.
Patented Oct. 22, 1912.
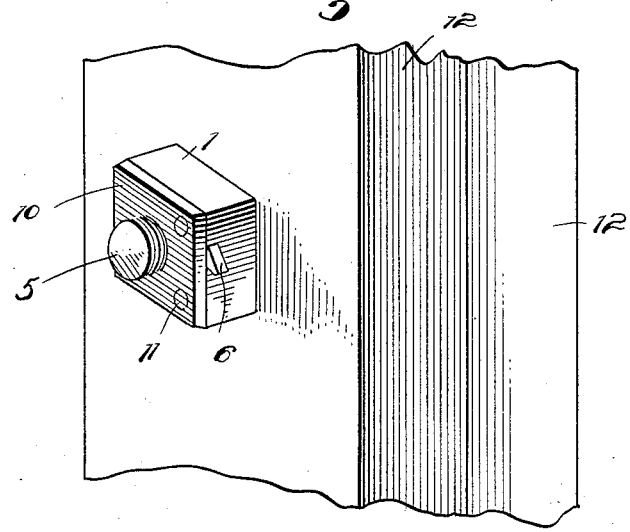
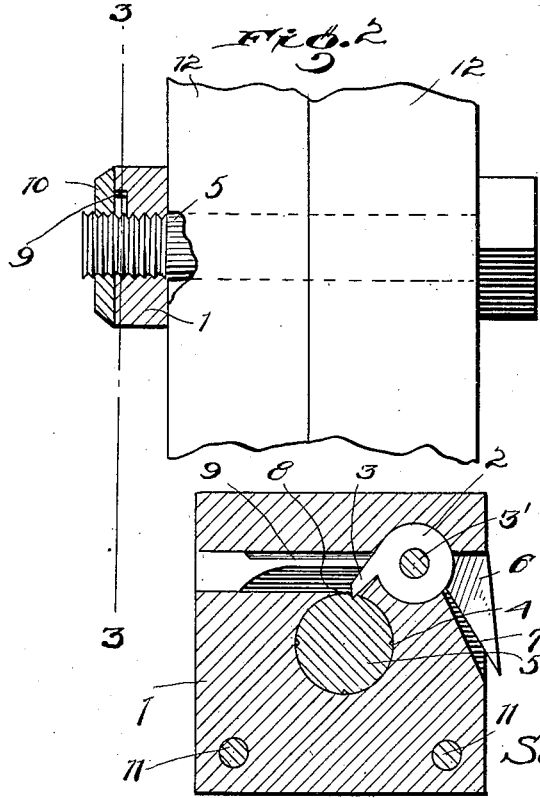
Witnesses
Inventor
Samuel T. Silver
By E. E. Vrooman,
his Attorney

UNITED STATES PATENT OFFICE.

SAMUEL T. SILVER, OF CALHOUN, GEORGIA.

NUT-LOCK.

1,042,158.  Specification of Letters Patent.  Patented Oct. 22, 1912.

Application filed October 11, 1910. Serial No. 586,526.

*To all whom it may concern:*

Be it known that I, SAMUEL T. SILVER, a citizen of the United States of America, residing at Calhoun, in the county of Gordon and State of Georgia, have invented certain new and useful Improvements in Nut-Locks, of which the following is a specification, reference being had therein to the accompanying drawing.
This invention relates to nut-locks, and has special reference to that class of nut-locks in which the nut is provided with a locking pawl adapted to engage the bolt and lock the nut from turning.
This invention has for its object to so construct a nut that the housing in which the spring is positioned will be completely closed when the nut is secured upon the bolt, thus preventing water or dirt from getting into the housing to interfere with the operation of the nut lock.

Referring to the accompanying drawings: Figure 1 is a view in perspective of a nut constructed in accordance with this invention, and in locked position on a bolt. Fig. 2 is a side view of the nut in longitudinal section shown in locked position on a bolt. Fig. 3 is an enlarged detail view of the nut in locked position on a bolt, and shown in cross-section on the line 3—3, Fig. 2.

The nut constructed in accordance with this invention is formed with a suitable recess in which is located a rotary pawl adapted to engage notches in a bolt, and held in engagement with the bolt by a spring, said pawl having a vibratable arm which projects through a recess or opening in one of the sides of the nut, and is adapted to be held within said recess with the pawl out of engagement with a bolt by the wrench clamped against the nut.

The aforesaid construction may be carried out in a suitable manner, and for the sake of illustration, the nut lock is constructed as shown in the accompanying drawing, in which 1 indicates a nut formed with a recess in which is mounted the collar or main portion 2 of a pawl 3, said collar or main portion 2 being mounted upon and adapted to turn on a pivot pin 3′ rotated in said recess. The pawl 3 is adapted to engage notches 4 in the bolt 5 on which the nut is mounted. The body 2 of the pawl is provided with an arm 6 located in a recess 7 in one side of the nut and adapted to vibrate in said recess, said arm 6 normally projecting out of said recess and from the side of the nut. The pawl 3 is held in engagement with one of the notches 4 of the bolt 5 by means of a spring 8, which is located in the recess 9 in the nut in which recess the pawl 3 is permitted to play, said recess opening into the bolt hole of the nut and the toe of said pawl being adapted to project through the said opening in the side of the bolt hole. The spring is provided with an enlarged outer end which completely fills the outer end portion of the recess 9 and is rigidly secured therein by any desired means.

The several parts as hereinbefore described are covered by means of a suitable plate 10 secured to the nut 1 by rivets 11 or in any other suitable manner. The bolt 5 is shown as extending through the members or parts 12 which are to be fastened together, the nut 1 having been screwed up on the bolt 5 against one of the members 12. It will readily be seen that the pawl 3 is held out of engagement with the bolt 5 by a wrench which clamps the nut and holds arm 6 in the recess 7. When the nut has been screwed up to the position shown in Figs. 1 and 2 and the wrench has been removed from the nut, the spring 8 causes the pawl 3 to be thrown into engagement with one of the notches 4 of the bolt 5, the arm 6 projecting from one side of the nut. When it is desired to release the nut from the bolt, the pawl 3 is thrown out of engagement with the bolt by the clamping action of the wrench against the arm 6, thereby permitting the nut to be unscrewed from the bolt. After the nut has been screwed upon the bolt the spring housing 9 is completely closed, since the enlarged end of the spring closes one end, the body 2 of the pawl closes the opposite end and the bolt closes the opening leading to the threaded opening of the nut.

Having described the invention I claim:—

In a nut lock, a body portion provided with a central threaded opening, one face of said body portion being provided with a circular pivot well adjacent said central opening, a groove leading from one side of said body portion to said well and communicating with said central opening and forming a spring housing, and with a groove leading from the opposite side of said body portion to said well; a plug mounted in the outer end portion of said housing to close the outer end of said housing, a spring arm extending from said plug through said housing, a locking pawl comprising a cylindrical body portion mounted in said well and closing the inner end of said housing, a spur extending from said cylindrical body portion into said housing, said spring arm engaging said spur and causing said spur to normally protrude into said central opening, an operating handle extending from said cylindrical body portion through the groove in the opposite side of said body portion, and a cover plate secured to said body portion.

In testimony whereof I hereunto affix my signature in presence of two witnesses.

SAMUEL T. SILVER.

Witnesses:
W. F. Dew,
B. F. Stone.